United States Patent Office 2,729,784
Patented Jan. 3, 1956

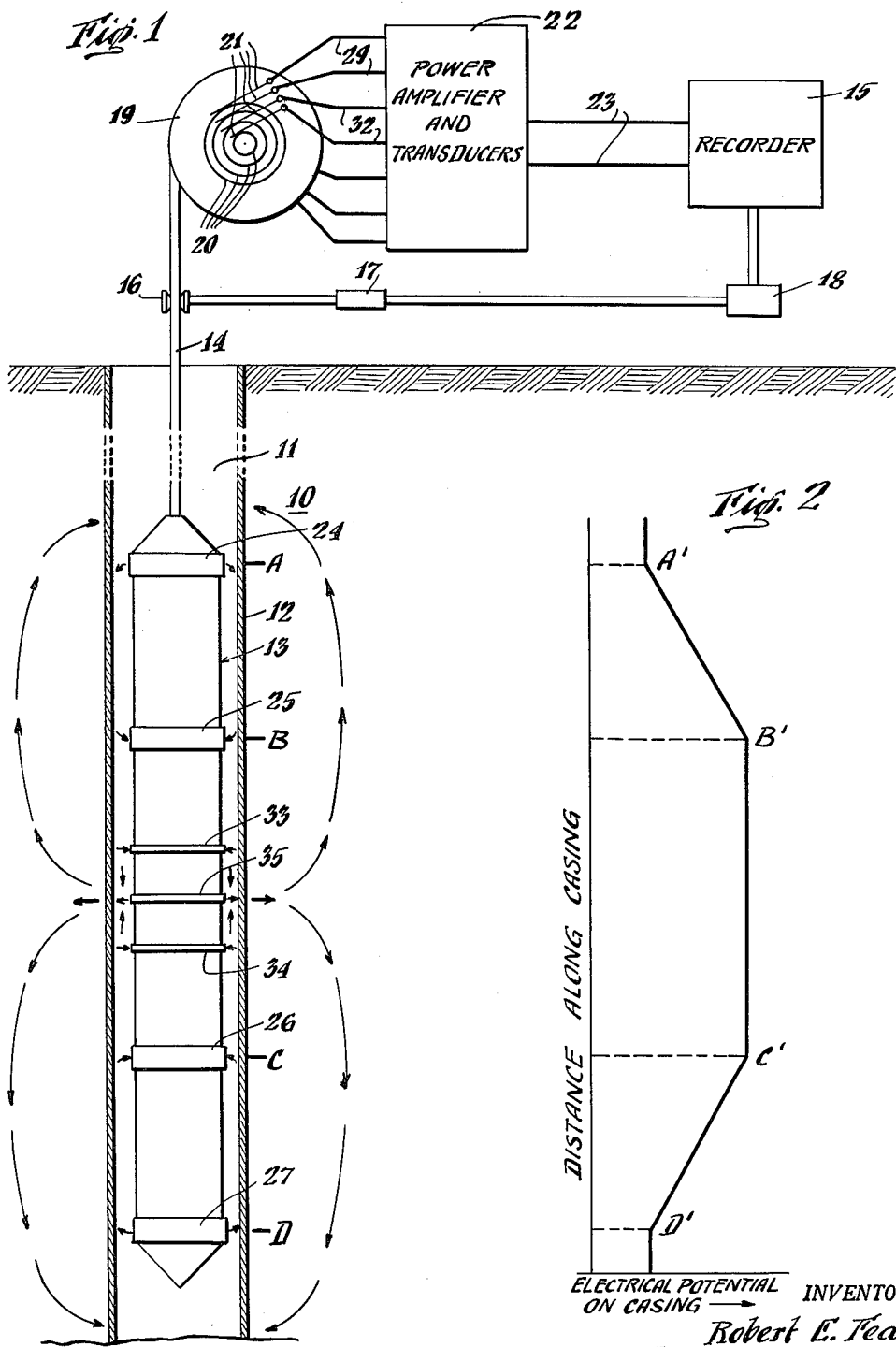

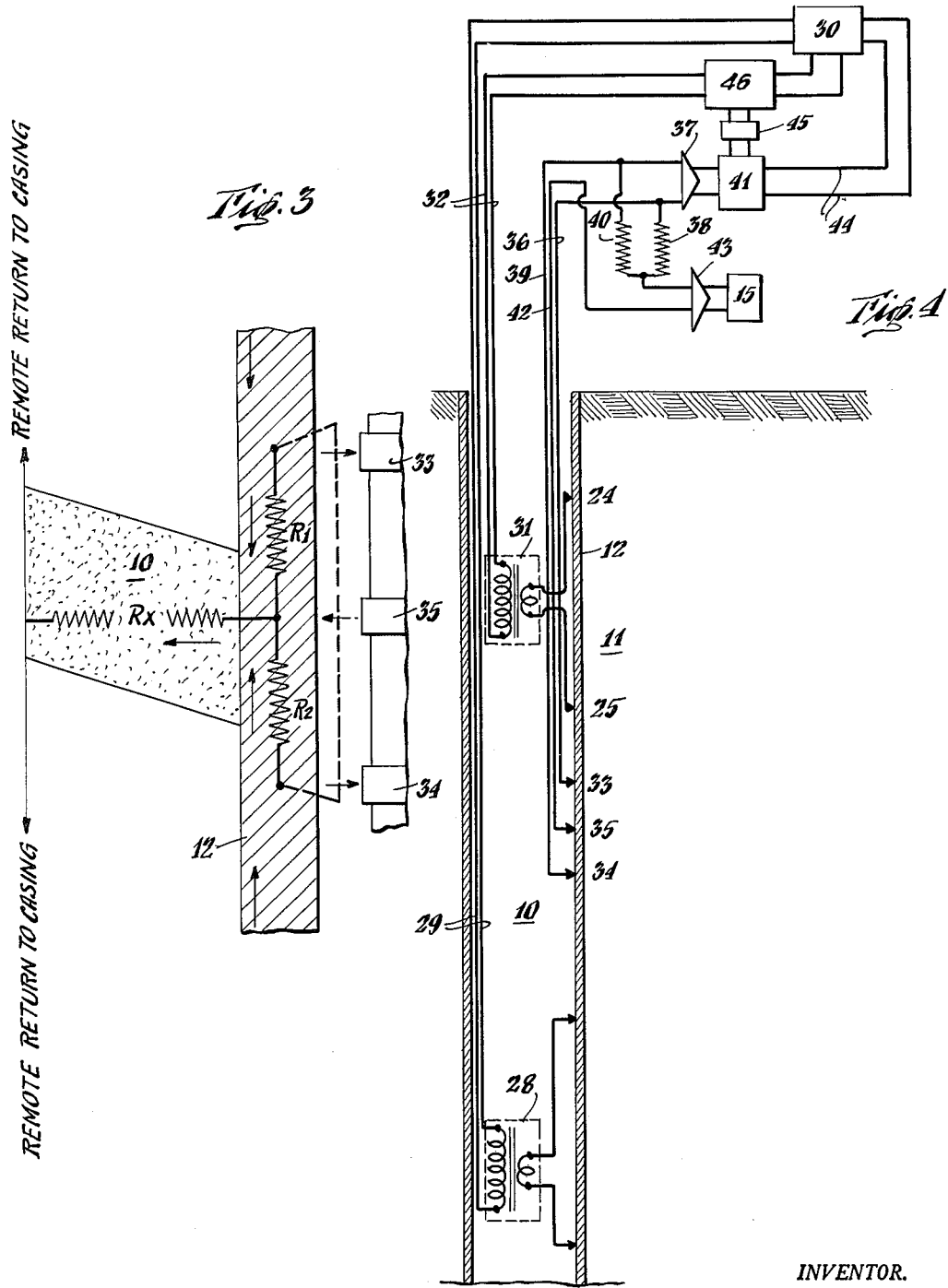

2,729,784

METHOD AND APPARATUS FOR ELECTRIC WELL LOGGING

Robert E. Fearon, Tulsa, Okla., assignor, by mesne assignments, to Lane-Wells Company, Los Angeles, Calif., a corporation of Delaware Application November 30, 1950, Serial No. 198,295

15 Claims. (Cl. 324—1)

This invention relates generally to the art of geophysical prospecting and more particularly to the art of well logging.

In recent years methods have been developed for logging cased drill holes which rely upon nuclear properties of the formations. Outstanding among these methods are those which measure the natural radioactivity of the formations and those which measure radiation which has been influenced by the formations. These methods have met with phenomenal success. However, these methods are subject to the deficiency that they have not been proven to be reliable in locating oil directly. It has long been established in the prior art that electrical methods which involve measurements of the resistivity of the formation penetrated by the well are systematically related to the occurrence of oil in the pore spaces of the rock. Therefore, the present invention concerns itself with an electrical method for logging the formations penetrated by a well regardless of whether the well is cased or whether it is filled with highly electrically conductive mud.

This is accomplished by causing a flow of alternating current in two longitudinally spaced portions of the casing or mud within the well by spaced pairs of energizing electrodes to effect an elevation of the potential produced in the casing or mud in the region between the portions in which current is caused to flow by the overlapping of the opposing electric fields produced by the current from said pairs of electrodes. A pair of axially spaced exploring electrodes are positioned within the region of elevated potential and so arranged with respect to the spaced pairs of energizing electrodes that the elevated potential at each of these exploring electrodes may be detected and maintained substantially constant by a novel feedback arrangement. Under such disposition of electrodes and potential distribution a third electrode positioned between the two above mentioned exploring electrodes can be used to indicate or measure the current flowing into or from the formations at that position. This indication or measurement is a function of the conductivity or resistivity of the formations adjacent this exploring electrode.

Therefore, the principal object of the present invention is to provide a novel method and apparatus whereby an electrical log can be made of a drill hole regardless of whether it is cased or filled with a conductive mud.

Another object of the instant invention is to provide a method and apparatus whereby an electrical log can be made of the formations adjacent a cased drill hole while appreciably reducing, if not completely eliminating, the errors introduced by longitudinal nonuniformity of casing. This invention also contemplates making an electrical log of the formations adjacent a well containing a conductive fluid.

Other objects and advantages of the present invention will become apparent from the following detailed description when taken with the drawings, in which:

Figure 1 is a diagrammatic illustration of a well surveying operation in accordance with the present invention showing exploring apparatus positioned within a well;

Figure 2 is a schematic illustration of the approximate potentials existing in the well casing or mud in the region being explored;

Figure 3 is an equivalent circuit diagram of the current paths established in the vicinity of the exploring electrodes; and Figure 4 is a schematic electrical wiring diagram illustrating in detail the electrical circuits and probes in relation to a cased drill hole during a well surveying operation.

Referring to the drawings in detail, particularly to Figure 1 there is illustrated an electrical well logging operation. A fragmentary portion of the earth's surface 10 is shown in vertical section. A well 11 provided with a casing 12 penetrates the formations of the earth's surface.

Disposed within the well 12 is a subsurface well logging instrument 13 as contemplated by the present invention. Instrument 13 is connected to and supported by a cable 14 that is adapted to carry the necessary electrical conductors for delivering power to the subsurface instrument and transmitting signals therefrom to a recorder 15 positioned on the surface of the earth. Recorder 15 may be driven by or in correlation with measuring wheel 16 through a suitable gear box 17 and transmission 18 by means of appropriate shafts. Measuring wheel 16 is adapted to be driven by the cable 14 when the instrument is caused to traverse the well. Cable 14 is adapted to be wound upon a drum 19 that is provided at opposite ends with slip rings 20 whereby electrical connection can be made to the conductors contained in cable 14. Brushes 21 which engage the slip rings 20 are individually connected to conductors which lead to a unit 22 which houses a power supply, amplifiers, and the transducers necessary to the well surveying operation. The output signal from unit 22 is conducted to recorder 15 by the conductors 23 and recorded in correlation with the depth at which the signals originated.

In order to better describe the construction and operation of the apparatus forming the subject matter of this invention reference will be made to Figures 1, 2, and 4. As shown in Figure 1, the subsurface instrument 13 is provided with bands 24, 25, 26, and 27. These bands are secured to the outer surface of the instrument 13 and are insulated from each other and from the housing of the instrument. The outer surface of the instrument may be coated in its entirety, inside the bands, with electrically insulating material. Bands 24 and 25 serve as electrodes by means of which alternating current can be introduced into that portion of the well casing between the bands. Bands 26 and 27 also serve to introduce alternating current into that portion of the well casing between bands 26 and 27. The manner in which the two pairs of bands comprising bands 24 and 25 and bands 26 and 27 are supplied with power can be readily understood by reference to Figure 4. Electrodes 26 and 27 are connected to the secondary of a step-down transformer 28 which is disposed within the bottom portion of the housing of instrument 13. The primary of transformer 28 is supplied through the conductors 29 which enter the cable 14 with power from a source 30 located on the surface of the earth but within the unit 22. Electrodes 24 and 25 are connected across the secondary of a second and similar step-down transformer 31, which is also located within the housing of the subsurface instrument 13. The primary winding of transformer 31 is supplied with power through conductors 32 which enter the cable 14 and connect through a power control element 46 to the power supply 30. As pointed out above the power supply 30 as well as the control element 46 are contained within the unit 22.

In Figure 2 the curve A'B'C'D' illustrates the electrical potential produced along the well casing 12 when current is caused to flow therein in the manner described immediately above. The points marked A', B', C', and D' correspond to the position of the electrodes 24, 25, 26, and 27 with respect to the casing 12 of the well 11 as illustrated in Figure 1. The potentials as portrayed by the diagram are those which would exist in a casing possessing uniform electrical resistance per unit of length and for which the effect of current entering or leaving the casing through the adjacent strata has, for the time being, been neglected. As shown by this curve, the potential along the casing linearly increases from the point A' to point B'. The distance from A' to B' along the vertical coordinate of the curve corresponds to the distance between the electrodes 24 and 25 carried by the instrument 13. The curve is drawn as though the electrodes 24 and 25 contact the casing 12 at a point, in each instance. The potential represented by that portion of the curve between C' and D' decreases linearly. The distance over which this decrease occurs corresponds to the distance between the electrodes 26 and 27, which are thought of as being connected at a point, in each instance, to the casing 12. The region of the curve between the points B' and C' corresponds with the potential on the casing lying between electrodes 25 and 26 of the instrument 13. Because of the opposing effects of the currents flowing between the electrode pairs previously described, the electric field and flow of current caused by the pairs approximately vanishes in the zone from B' to C', which corresponds with the section of the casing 12 lying in the region between electrodes 25 and 26 of the instrument 13.

As a result of the potential distribution which has been produced along the casing, the entire zone from A to D and more particularly the zone of the casing from B to C behaves as though it were a separate electrode at a potential with respect to earth which is elevated with respect to the potential of the remaining portion of the casing extending from D downward and from A upward. The virtual electrode thus produced creates in the earth adjacent to the casing a field of electric current flow which may be regarded as consisting of tubes of electric flux emerging perpendicularly from the virtual electrode in the region from B to C, passing through the earth distant from the virtual electrode in curved paths, and returning to the casing remotely. The amount of current emerging from any portion of the casing which lies in the region from B to C will be in general inversely proportional to the resistivity of the adjacent earth. This is more accurately so for strata which are several times thicker than the distance corresponding with the diameter of the casing. Since, as has been mentioned heretofore, resistivity or conductivity of the porous strata of the earth bear a systematic relationship to the occurrence of petroleum, any measurement which will react to the resistivity of the adjacent earth in which the casing lies will be indicative of petroleum.

In order to effect a measurement of the resistivity or conductivity of the porous strata lying adjacent the instrument 13, particularly in that region between electrodes 25 and 26, there is provided in this region three additional electrodes, 33, 34, and 35. These electrodes may be termed probes or exploring electrodes. Electrodes 33 and 34 are respectively spaced substantially equal distances from electrodes 25 and 26. Electrode 35 is positioned substantially midway between the electrodes 33 and 34 and midway in the zone defined by electrodes 25 and 26. As shown in Figure 4, electrode 33 is connected by conductor 36, which is carried by the cable 14, to one side of amplifier 37 and to resistance 38. Electrode 34 is connected by conductor 39, which is also carried by cable 14, to the other side of amplifier 37 and to one end of resistance 40. With this arrangement any difference in potential existing between electrodes 33 and 34 will be impressed upon the input of amplifier 37. The output of amplifier 37 is conducted to a linear modulator 41 for a purpose to be described later. Electrode 35 is connected through conductor 42, which is also carried by the cable 14, to one side of an amplifier 43. The other side of the input of amplifier 43 is connected to the junction of resistors 38 and 40. Although the potential difference across resistors 38 and 40 in series is made close to zero, the resistance of resistor 38 is preferably equal to that of resistor 40 so that any difference in potential existing between electrodes 33 and 35 and between 34 and 35 will be averaged by the resistors 38 and 40 and their average impressed on the input of amplifier 43. The output of this amplifier is then conducted to the recorder 15. It is desirable to reduce the difference of potential between electrode 33 and electrode 34 as influenced by the adjacent casing to a very small value. To accomplish this, the output of the amplifier 37 is caused to act upon the linear modulator 41. The linear modulator 41 may take the form of a number of linear modulators common and conventional in the field of telephony, such as those described in the article "Copper oxide modulators in carrier telephone systems," by R. S. Caruthers, 18 The Bell System Technical Journal 315 (1939). Such linear modulators produce linear modulation, that is, there is linearity between input and output signal amplitudes. Although other apparatus may be used to derive a signal from the output of amplifier 37 which can be fed back to the subsurface current electrodes to reduce the voltage differential between electrodes 33 and 34, the linear modulator is to be preferred. When a linear modulator, such as the so-called ring modulator, is used with both input voltages of the same frequency, among the output modulation products is a direct current voltage directly proportional to the product of the amplitudes of the input voltages. In the apparatus of Figure 4, a product is formed with a signal derived from the power source 30 through conductors 44. The product so formed contains a direct current component which will have a sign determined by the relative phases of the two above stated inputs. The signal from the power source 30 is normally constant, and therefore the direct current component is directly proportional to the amplitude of the alternating potential between electrodes 33 and 34. The direct current component is isolated by means of the low pass filter 45. This direct current component is used to control the flow of current from the power source 30 through the controller 46 and the conductors 32 to the transformer 31. With this arrangement, the current introduced into the casing 12 by the secondary of transformer 31 can be varied to more nearly balance the potentials on the electrodes 33 and 34. In order to establish this condition the control element 46 may be made a linear modulator which will function on being supplied with direct current from filter 45 to vary the power supply to transformer 31 in a direction that will bring the potentials existing on electrodes 33 and 34 to more nearly the same value. This may be generally described as a negative feed-back system.

In operation the instrument 13 is caused to traverse the well 11 by raising or lowering it by means of the drum 19 which is powered by a source not shown. While traversing the well electrode pairs consisting of electrodes 24 and 25 and electrodes 26 and 27 are supplied with energy in the manner described above to cause current to flow in those portions of the casing 12 lying between electrodes 24 and 25 and between electrodes 26 and 27. The current enters the casing from the electrodes by passing through a conductive fluid such as a solution of salt water which may be regarded as filling the casing and surrounding the electrodes. For any wells in which it is inconvenient to fill with salt water, the electrodes 24, 25, 26 and 27 may be regarded as made up of steel brushes which maintain a metallic contact with the casing. The exploring electrodes 33, 34, and 35 may be similarly arranged. This flow of current as pointed out in connection with the description of Figure 2 produces potentials along the casing which vary in the manner there described.

Because of the fact that casing 12 is in electrically conductive juxtaposition with the strata of the bore hole in which it is set owing to the presence of fluid in the annular space between it and the bore hole, there is established in the adjacent material of the earth a potential distribution which is related to the potential distribution illustrated in Figure 2. The nature of this relationship is such that the potential existing in the strata satisfies the equations of electrical flow applicable for a continuous conducting medium, and reduces to the potential distribution of Figure 2 at the boundary of the casing. Therefore, it may be seen that the potentials as illustrated by the curve of Figure 2 will cause tubes of electric flux, i. e., current, to emerge from the casing to the adjacent earth in the region from B to C and return to the casing through the earth remotely. Since the electric flux, which emerges in this manner into the earth, comes from the casing, it must enter that portion of the casing either from electrodes immediately adjacent, or, if current electrodes do not exist immediately adjacent the casing, the current which escapes into the strata must necessarily enter the portion of the casing from which it escapes from other nearby portions of the casing.

It is this escaping electric flux that we desire to measure. Totality of these fluxes are represented in the form of current paths through equivalent circuit elements in Figure 3. Although the electrical resistance of a finite length of casing parallel to the axis is quite small, it is not zero. Accordingly, therefore, that portion of the current entering the casing from above and emerging into the adjacent sandstone passes through a resistance which may be represented as having the value $R_1$. Similarly, that portion of the current which is supplied from below and which emerges into the adjacent formation may be represented as passing through a resistance $R_2$ from the part of the casing lying between the points which are indicated as corresponding with the ends of the resistors. Since means has been provided to reduce the potential of the remote terminals of resistors $R_1$ and $R_2$, and since this means may be made to operate to any desired extent, it is convenient to assume that the differences of potential between the remote ends of these resistors have been made to vanish. The enforcement of this condition is diagrammatically illustrated by the dashed line joining these terminal ends. The current which emerges through the sandstone encounters a resistance $R_x$ which limits the amount so emerging in a determinative manner because $R_x$ is a vastly higher resistance than either $R_1$ or $R_2$. $R_x$ represents the resistance corresponding with a current path emerging from an element of length of the casing in the vicinity of the resistor diagrammatically indicated as $R_x$, and returning to the casing remotely. The current passing throught the resistor $R_x$ is a quantitative measure of $R_x$ and is inversely proportional thereto. This is a consequence of Ohm's law. Since the remote terminals of $R_1$ and $R_2$ are maintained at a substantially equal potential, these resistors may be regarded for present purposes as though they were connected together. Accordingly, therefore, the resistance which the current passing through $R_x$ encounters in the nearby portion of the casing may be taken as the resistance of the parallel combination of $R_1$ and $R_2$ which is $$R_{1,2} = \left(\frac{1}{R_1} + \frac{1}{R_2}\right)^{-1}$$

The potential drop thereby observed by means of the system corresponds with the ohmic drop in $R_{1,2}$ corresponding with current flowing through $R_x$. This ohmic drop is represented by the product of the elevation of voltage of that portion of the casing in the region of the probe electrodes by the reciprocal of $R_x$ and by $R_{1,2}$. This product is plotted by the recorder 15 of Figure 2, and as may be seen is inversely proportional to $R_x$. If it is desired to measure resistivity rather than reciprocal resistivity a suitable computing means may be employed to electrically determine the reciprocal before energizing the recorder.

Methods of the prior art generally related themselves to the measurement of steady potentials produced in the casing by introducing a large direct current at the top. Alternating current was not preferred in such methods because it dies out faster with depth than does direct current. Such methods will be unfavorably influenced by large galvanic currents generated by the action of solutions having varying concentrations of salt in the sequence of strata traversed. The use of alternating current overcomes the defects of such direct current arrangements. Also, this invention overcomes the difficulty of transmitting alternating current down the casing by energizing the casing with alternating current in the close vicinity of the locale of the probe electrodes.

Furthermore, in the prior art, it was always necessary to take derivatives and make computations of various sorts from the data originally recorded. Interpretations so made are subject to human error, and, since they must be derived from differences of data, are less accurate than the original data.

These objections are overcome by measuring by the three electrode probe system, a suitable approximation to the second derivative of potential which is needed to give data about the resistivity or conductivity of the neighboring rock.

Even if the workers of the prior art had used alternating current, and had employed the three electrode probe to take the second derivative of potential, there is yet another error which is reduced to zero by the provision, by this invention, of an arrangement to render electrodes 33 and 34 equipotential. The error in the measurement which is eliminated by this equipotential choice may be understood by reference to Figures 3 and 4, and the following discussion. The alternating potentials of electrodes 33, 35, and 34 are respectively designated $V_1$, $V_2$, and $V_3$, and correspond with those of wires 36, 42, and 39, respectively, and, in Figure 3, with the potential of the upper end of resistor $R_1$ and with the junction of $R_1$, $R_2$, and $R_x$ and with the lower end of $R_2$, also respectively. The currents passing through resistors $R_1$, $R_2$, and $R_x$ are designated respectively $i_1$, $i_2$, and $i_x$. From the electrical theorem that the algebraic sum of currents going to a point must be zero $i_1 - i_2 = i_x$ if the positive sense of current in $R_1$ and $R_2$ is downward, and the positive sense of current in $R_x$ is outward.

$$i_1' = i_2' \qquad (1)$$

and each equals the algebraic average of current in $R_1$ and $R_2$.

$$i_1'(R_1 + R_2) = V_1 - V_3 \qquad (2)$$

Additionally, $i_x$ divides into two parts, $$\frac{i_x R_2}{R_1 + R_2}$$

which comes down from above through $R_1$ and $$\frac{i_x R_1}{R_1 + R_2}$$

which comes up from below through resistor $R_2$ when $V_1 - V_3$ is small compared to $V_1$ or $V_3$. Therefore:

$$i_1' + \frac{i_x R_2}{R_1 + R_2} = i_1 \qquad (3)$$

where $i_1$ is the total current in $R_1$ and $$i_1' - \frac{i_x R_1}{R_1 + R_2} = i_2 \qquad (4)$$

where $i_2$ is the total current in $R_2$.

Now the circuit of Figure 4 performs the operation $$S = \frac{V_1 + V_3}{2} - V_2$$

where S is the recorded value, and $V_1$, $V_2$, and $V_3$ are as defined heretofore.

$$S = \tfrac{1}{2}(V_1 - V_2) - \tfrac{1}{2}(V_2 - V_3) \quad (5)$$

where $$V_1 - V_2 = i_1 R_1$$
$$V_2 - V_3 = i_2 R_2$$

Using the values of $i_1$ and $i_2$ of Equations 3 and 4

$$S = \tfrac{1}{2}\left[i_1' + i_x\left(\frac{R_2}{R_1 + R_2}\right)\right]R_1 - \tfrac{1}{2}\left[i_1' - i_x\left(\frac{R_1}{R_1 + R_2}\right)\right]R_2 \quad (6)$$

regrouping terms:

$$S = \tfrac{1}{2}i_1'(R_1 - R_2) + i_x\left(\frac{R_1 R_2}{R_1 + R_2}\right) \quad (7)$$

It is to be noted that of the two above terms of the quantity recorded by the circuit of Figure 4, only the second one is a function of $i_x$, which it is desired to measure. The first term is made zero by the equipotential condition, taking $i_1' = i_2' = 0$, and as pointed out above, $i_1'(R_1 + R_2) = V_1 - V_3 = 0$, $V_1 = V_3$.

Since the equipotential condition of this invention was not recognized by workers of the prior art, there are, in previous work large errors related to the first term of Equation 7 whenever $R_1$ is not equal to $R_2$ and the quantity of current proportional to $V_1 - V_3$ is great, as will be the case when current is introduced at the top of the casing. Such error has been eliminated in the present invention, as has been shown, and, since the difference of $R_1$ and $R_3$ has also been rendered less critical, the present method is more tolerant of nonuniform casing.

It is to be understood that other modifications of the instant invention will become apparent to those skilled in the art and that the invention is to be restricted only by the appended claims.

I claim:

1. A method of making an electric log of the formations adjacent a well which contains an electrically conductive medium, that comprises introducing a first electrical current between a first pair of axially spaced positions bounding a first portion of said electrically conductive medium in a manner such that said first electrical current will have a substantial axial component, separately introducing a second electrical current between a second pair of axially spaced positions bounding a second portion axially spaced from said first portion of said electrically conductive medium in a manner such that said second electrical current will have a substantial axial component opposite to said axial component of said first electrical current, whereby the flow of the axial components in opposite directions will create on a pair of axially spaced locations in the region between said portions substantially equal potentials different from the potential of any given reference point located in remote portions of said electrically conductive medium, and measuring a function of the current conducted between said region and the formation adjacent thereto.

2. A method of making an electric log of the formations adjacent a well which contains an electrically conductive medium, that comprises introducing a first electrical current into a first portion of said electrically conductive medium in a manner such that said first electrical current will have a substantial axial component, introducing a second electrical current into a second portion axially spaced from said first portion of said electrically conductive medium in a manner such that said second electrical current will have a substantial axial component opposite to said axial component of said first electrical current, whereby the flow of the axial components in opposite directions will create on a pair of axially spaced locations in the region between said portions substantially equal potentials different from the potential of any given reference point located in the remote portions of said electrically conductive medium, detecting any difference in potential between said locations, employing any such difference to vary the electrical current introduced into one of said portions of the conductive medium to maintain said locations at substantially equal potentials, and measuring any difference in potential between two axially spaced places in said region at least one of which is axially spaced from both of said locations as a function of the current conducted between said region and the formation adjacent thereto.

3. A method of making an electric log of the formations adjacent a well which contains an electrically conductive medium, that comprises introducing a first electrical current into a first portion of said electrically conductive medium in a manner such that said first electrical current will have a substantial axial component, introducing a second electrical current into a second portion axially spaced from said first portion of said electrically conductive medium in a manner such that said second electrical current will have a substantial axial component opposite to said axial component of said first electrical current, whereby the flow of the axial components in opposite directions will create on a pair of axially spaced locations in the region between said portions substantially equal potentials different from the potential of any given reference point located in remote portions of said electrically conductive medium, detecting any difference in potential between said locations, employing any such difference to vary the electrical current introduced into one of said portions of the electrically conductive medium to maintain said locations at substantially equal potentials, also detecting any difference in potential between a place substantially midway between said locations and each of said pair of locations, averaging the differences in potential so detected, and measuring the average of said differences in potential as a function of the electrical current flowing between said region of the electrically conductive medium and the formations adjacent thereto.

4. A method of making an electric log of the formations adjacent a well which contains a metallic casing, that comprises introducing a first electrical current between a first pair of axially spaced positions bounding a first portion of said metallic casing in a manner such that said first electrical current will have a substantial axial component, separately introducing a second electrical current between a second pair of axially spaced positions bounding a second portion axially spaced from said first portion of said metallic casing in a manner such that said second electrical current will have a substantial axial component opposite to said axial component of said first electrical current, whereby the flow of the axial components in opposite directions will create on a pair of axially spaced locations substantially symmetrically arranged in the region between said portions substantially equal potentials different from the potential of any given reference point located in remote portions of said metallic casing, detecting any difference in potential between said locations, employing any such difference to vary the electrical current introduced into one of said portions of the metallic casing to maintain said locations at substantially equal potentials, also detecting any difference in potential between a place substantially midway between said locations and each of said locations, averaging the differences in potential so detected, and measuring the average of said differences in potential as a function of the electrical current flowing between said region of the metallic casing and the formations adjacent thereto.

5. A method of making an electric log of the formations adjacent a well which contains a casing, that comprises introducing a first alternating electrical current between a first pair of axially spaced positions bounding a first portion of said casing in a manner such that said first alternating electrical current will have a substantial axial component, separately introducing a second alternating electrical current between a second pair of axially spaced positions bounding a second portion axially spaced from said first portion of said casing in a manner such that said second alternating electrical current will have a substantial axial component opposite to said axial component of said first alternating electrical current, whereby the flow of the axial components in opposite directions will create on a pair of axially spaced locations substantially symmetrically arranged in the region between said portions substantially equal potentials different from the potential of any given reference point located in remote portions of said casing, detecting any difference in potential between said locations, employing any such difference to vary the electrical current introduced into one of said portions of the casing to maintain said locations at substantially equal potentials, also detecting any difference in potential between a place substantially midway between said locations and each of said locations, averaging the differences in potential so detected, and measuring the average of said differences in potential as a function of the electrical current flowing between said region of the casing and the formations adjacent thereto.

6. Apparatus for making an electrical log of the formations adjacent a well which contains an electrically conductive medium that comprises a source of electrical current, a first pair of axially spaced current electrodes, means for introducing a first electrical current between said first pair of current electrodes bounding a first portion of said electrically conductive medium in a manner such that said first electrical current will have a substantial axial component, a second pair of axially spaced current electrodes axially spaced from said first pair of current electrodes, a pair of axially spaced exploring electrodes in the region between said first and second pairs of current electrodes, separate means for introducing a second electrical current between said second pair of current electrodes bounding a second portion axially spaced from said first portion of said electrically conductive medium in a manner such that said second electrical current will have a substantial axial component opposite to the axial component of said first electrical current, whereby the flow of the axial components in opposite directions will create substantially equal potentials on said exploring electrodes different from the potential of any given reference point located in remote portions of said electrically conductive medium, and means for measuring a function of the current conducted between said region and the formation adjacent thereto.

7. Apparatus for making an electrical log of the formations adjacent a well which contains an electrically conductive medium that comprises a source of electrical current, a pair of axially spaced exploring electrodes disposed in said electrically conductive medium, means for introducing a first electrical current into a portion of said electrically conductive medium in a manner such that said first electrical current will have a substantial axial component, means for introducing a second electrical current into a second portion axially spaced from said first portion of said electrically conductive medium in a manner such that said second electrical current will have a substantial axial component opposite to said axial component of said first electrical current, whereby the flow of the axial components in opposite directions will create on said exploring electrodes located in the region between said portions substantially equal potentials different from the potential of any given reference point located in the remote portions of said electrically conductive medium, means for detecting any difference of potential between said exploring electrodes, means responsive to any such difference in potential for varying the electrical current introduced into one of said portions of the electrically conductive medium to maintain said exploring electrodes at substantially equal potentials, at least one measuring electrode in said region axially spaced from both of said exploring electrodes, and means for measuring any difference in potential between a measuring electrode and at least one other of said electrodes in said region as a function of the current conducted between said region and the formation adjacent thereto.

8. Apparatus for making an electrical log of the formations adjacent a well which contains an electrically conductive medium that comprises a source of electrical current, a first pair of axially spaced current electrodes, means for introducing a first electrical current between said first pair of current electrodes bounding a first portion of said electrically conductive medium in a manner such that said first electrical current will have a substantial axial component, a second pair of axially spaced current electrodes axially spaced from said first pair of current electrodes, a pair of axially spaced exploring electrodes in the region between said first and second pairs of current electrodes, separate means for introducing a second electrical current between said second pair of current electrodes bounding a second portion axially spaced from said first portion of said electrically conductive medium in a manner such that said second electrical current will have a substantial axial component opposite to said axial component of said first electrical current, whereby the flow of the axial components in opposite directions will create substantially equal potentials on said exploring electrodes different from the potential of any given reference point located in remote portions of said electrically conductive medium, means for detecting any difference in potential between said exploring electrodes by producing an electrical signal related thereto, means responsive to said signal for varying the electrical current introduced into one of said portions of the electrically conductive medium to maintain said locations at substantially equal potentials, a measuring electrode located substantially midway between said exploring electrodes, means for detecting any difference in potential between the midway measuring electrode and each of said exploring electrodes, means for averaging the differences in potential so detected, and means for measuring the average of said differences in potential as an indication of a function of the electrical current conducted between the electrically conductive medium and the formation adjacent thereto.

9. Apparatus for making an electrical log of the formations adjacent a well which contains a metallic casing that comprises a source of electrical current, a first pair of axially spaced current electrodes, means for introducing a first electrical current between said first pair of current electrodes bounding a first portion of said metallic casing in a manner such that said first electrical current will have a substantial axial component, a second pair of axially spaced current electrodes axially spaced from said first pair of current electrodes, a pair of axially spaced exploring electrodes in the region between said first and second pairs of current electrodes, separate means for introducing a second electrical current between said second pair of current electrodes bounding a second portion axially spaced from said first portion of said metallic casing in a manner such that said second electrical current will have a substantial axial component opposite to the axial component of said first electrical current, whereby the flow of the axial components in opposite directions will create substantially equal potentials on said exploring electrodes different from the potential of any given reference point located in remote portions of said metallic casing, means for detecting any difference in potential between said exploring electrodes by producing an electrical signal related thereto, means responsive to said signal for varying the electrical current introduced into one of said portions of the metallic casing to maintain said locations at substantially equal potentials, a measuring electrode located substantially midway between said exploring electrodes, means for detecting any difference in potential between the midway measuring electrode and each of said exploring electrodes, means for averaging the differences in potential so detected, and means for measuring the average of said differences in potential as an indication of a function of the electrical current conducted between the metallic casing and the formation adjacent thereto.

10. Apparatus for making an electrical log of the formations adjacent a well which contains a metallic casing that comprises a source of alternating electrical current, a first pair of axially spaced current electrodes, means for introducing a first alternating electrical current between said first pair of current electrodes bounding a first portion of said metallic casing in a manner such that said first alternating electrical current will have a substantial axial component, a second pair of axially spaced current electrodes axially spaced from said first pair of current electrodes, a pair of axially spaced exploring electrodes in the region between said first and second pairs of current electrodes, separate means for introducing a second alternating electrical current between said second pair of current electrodes bounding a second portion axially spaced from said first portion of said metallic casing in a manner such that said second alternating electrical current will have a substantial axial component instantaneously opposite to said axial component of said first alternating electrical current, whereby the flow of the axial components in opposite directions will create substantially equal potentials on said exploring electrodes different from the potential of any given reference point located in remote portions of said metallic casing, means for detecting any difference in potential between said exploring electrodes by producing an electrical signal related thereto, means responsive to said signal for varying the alternating electrical current introduced into one of said portions of the metallic casing to maintain said locations at substantially equal potentials, a measuring electrode located substantially midway between said exploring electrodes, means for detecting any difference in potential between the midway measuring electrode and each of said exploring electrodes, means for averaging the differences in potential so detected, and means for measuring the average of said differences in potential as an indication of a function of the alternating electrical current conducted between the metallic casing and the formation adjacent thereto.

11. An apparatus for making an electric log of the formations penetrated by a cased well that comprises in combination a source of alternating current, a first pair of axially spaced current electrodes, means for introducing a first alternating current from said source between said first pair of current electrodes bounding a first portion of the casing in a manner such that said first alternating current will have a substantial axial component flowing in the casing, a second pair of axially spaced current electrodes axially spaced from said first pair of current electrodes, a pair of axially spaced exploring electrodes in the region between said first and second pairs of current electrodes, separate means for introducing a second alternating current between said second pair of current electrodes bounding a second portion of the casing that is axially spaced from said first portion of the casing in a manner such that said second alternating current will have a substantial axial component flowing in the casing instantaneously opposite to said axial component of said first alternating current, whereby the flow of the axial components in opposite directions will create substantially equal potentials on said exploring electrodes different from the potential of any given reference point located in remote portions of said casing, means for detecting any difference in potential between said exploring electrodes by producing a signal related to such difference, feedback means responsive to said signal for varying the amount of alternating current supplied to one of said portions of the casing to maintain said locations at substantially equal potentials, a measuring electrode positioned between said exploring electrodes, means for detecting any difference in potential between each of said exploring electrodes and said measuring electrode, means for averaging the differences so detected, and means for measuring the average of the differences in potential as an indication of a function of the alternating current flowing between said region of the casing and the formations adjacent thereto.

12. An apparatus for making an electrical log of the formations penetrated by a cased drill hole that comprises in combination a subsurface instrument adapted to traverse the drill hole, means for raising and lowering the instrument in the drill hole, two pairs of axially spaced energizing electrodes carried by said subsurface instrument respectively adjacent opposite ends thereof and adapted to engage the casing of the drill hole, a source of electrical current located on the surface of the earth adjacent the mouth of the drill hole, means including one pair of electrodes for introducing a first electrical current into a first portion of said casing in a manner such that said first electrical current will have a substantial axial component flowing in the casing as the instrument traverses the well, a pair of exploring electrodes also carried by said subsurface instrument and disposed at axially spaced points which are between and substantially equidistant from the pairs of energizing electrodes, means including the other pair of electrodes for introducing a second electrical current into a second portion of the casing that is axially spaced from said first portion of the casing in a manner such that said second electrical current will have a substantial axial component flowing in the casing opposite to said axial component of said first electrical current as the instrument traverses the drill hole, whereby the flow of the axial components of the currents in opposite directions in the axially spaced portions of the casing as the instrument traverses the drill hole will create on said exploring electrodes substantially equal potentials different from the potential of any given reference point located in remote portions of the casing, means adapted to detect differences of potential between said pair of exploring electrodes by producing an electrical signal related thereto, means responsive to said signal for varying the electrical current introduced into one of said portions of the casing to maintain said pair of exploring electrodes at substantially equal potentials, a third exploring electrode carried by said subsurface instrument and disposed at a point substantially midway between said first recited exploring electrodes, means to detect differences in potential between the third exploring electrode and each of the first recited exploring electrodes, means for transmitting the detected differences in potential to the surface of the earth, means at the surface of the earth for receiving and averaging the differences in potential, and means also at the surface of the earth adapted to record the average of the differences in potential as an indication of a function of the current flow between said region of the casing and the formations adjacent thereto.

13. In a method of investigating earth formations traversed by a bore hole containing a column of conductive liquid, the steps of passing electric current through the surrounding formations between a pair of locations spaced a short distance apart in the bore hole, establishing an electric field in the vicinity of one of said locations of such magnitude and polarity as to cause the current flow in the vicinity of said one location to follow a path substantially perpendicular to the wall of the bore hole and obtaining indications of potential difference between two places in the bore hole where the potential gradient attributable to the combined effect of said current and said electric field is substantially zero, the spacing between said locations and said places being such that said locations cannot be considered to be at electrical infinity with respect to said places.

14. In apparatus for investigating earth formations traversed by a bore hole containing a column of conducting liquid, the combination of at least two principal current electrodes mounted for movement through the bore hole in spaced apart relation, the spacing between said electrodes being such that one of them cannot be regarded as at electrical infinity with respect to the other, a source of electrical energy connected to said electrodes for passing current through the surrounding formations, electrically energized means for establishing in the vicinity of said other electrode an electric field of such magnitude and polarity as to cause a part of said current flowing in the vicinity of said other electrode to follow a path substantially perpendicular to the wall of the bore hole, third and fourth electrodes mounted in fixed relation with respect to said current electrodes at locations where the potential gradient attributable to the combined effect of said current and said electric field is substantially zero, and electrical indicating means connected between said third and fourth electrodes.

15. In a method of investigating earth formations traversed by a bore hole containing a column of conductive liquid, the steps of passing electric current through the surrounding formations between a pair of locations spaced axially a short distance apart in the bore hole, establishing an electric field in the vicinity of one of said locations of such magnitude and polarity as to cause the current flow in the vicinity of said one location to follow a path substantially perpendicular to the wall of the bore hole, obtaining indications of potential difference between two axially spaced places in the bore hole where the potential gradient attributable to the combined effect of said current and said electric field is substantially zero, utilizing said indications to vary said electric field to maintain said current flow in the vicinity of said one location substantially perpendicular to the wall of the bore hole, and measuring the potential difference between two positions in the bore hole where the potential gradient attributable to the combined effect of said current and said electric field is substantially zero, at least one of said positions being spaced from both of said places.

References Cited in the file of this patent
UNITED STATES PATENTS

| | | |
|---|---|---|
| 1,842,362 | Nichols | Jan. 19, 1932 |
| 2,206,892 | Hawley | July 9, 1940 |
| 2,317,259 | Doll | Apr. 20, 1943 |